R. STAHL.
RADIATOR HOOD.
APPLICATION FILED FEB. 7, 1918.
1,322,970.
Patented Nov. 25, 1919.
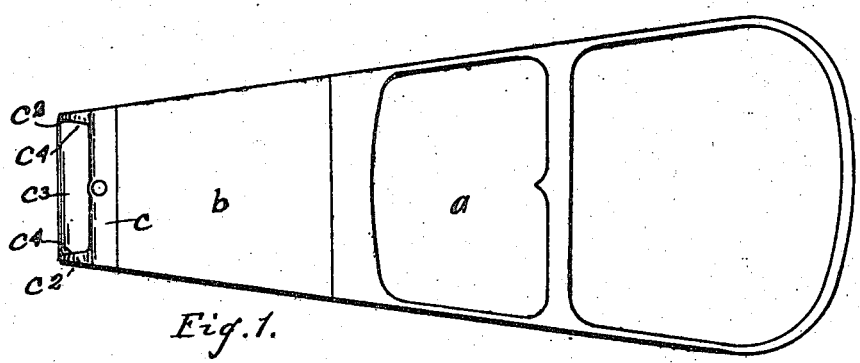
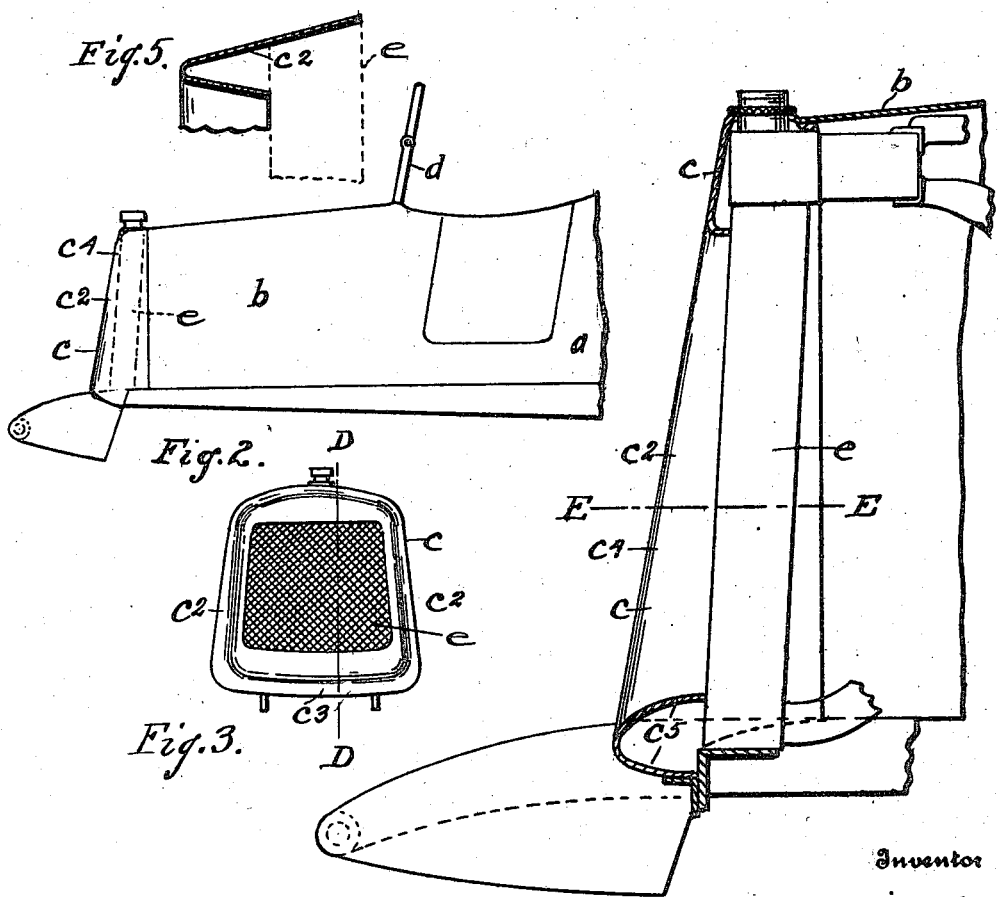

UNITED STATES PATENT OFFICE.

RODOLPHE STAHL, OF JACKSON, MICHIGAN.

RADIATOR-HOOD.

1,322,970.   Specification of Letters Patent.   Patented Nov. 25, 1919.

Application filed February 7, 1918. Serial No. 215,878.

*To all whom it may concern:*

Be it known that I, RODOLPHE STAHL, a citizen of the United States, residing at Jackson, county of Jackson, State of Michigan, have invented a certain new and useful Improvement in Radiator-Hoods, and declare the following to be a full, clear, and exact description of the same, such as will enable others skilled in the art to which it pertains to make and use the same, reference being had to the accompanying drawings, which form a part of this specification.

My invention relates to automobiles and an object of my improvements is to provide a radiator cover which shall improve the appearance and outline of the automobile without impeding the draft through the radiator tubes.

I secure this object in the apparatus illustrated in the accompanying drawing in which, Figure 1 is a plan view of a construction embodying my invention with so much of an automobile as is necessary to illustrate its connection therewith.

Fig. 2 is a side view of the same.

Fig. 3 is an elevation showing a front elevation of the same.

Fig. 4 is a sectional elevation of a part of the same to an enlarged scale, the section being taken on the line D—D Fig. 3.

Fig. 5 is a detail section on the line E—E Fig. 4.

$a$ is the body of an automobile, $b$ is the motor hood or cover, $d$ is the wind shield.

The prevailing taste requires the up and down lines in an automobile to incline from the vertical or to rake. This is embodied in the wind shield as indicated in Fig. 2 and in the general construction as seen in side elevation.

In the usual construction the radiator forms the front of the automobile and in order to get an unobstructed passage for the air through the apertures in the radiator, it is necessary to place the radiator approximately vertical which gives an unacceptable appearance to the front of the automobile. It is, in part, to avoid this appearance and to conform the outline at this point to the rest of the automobile that forms an object of my improvements.

$e$ is the radiator core. This is placed in the usual position, arranged approximately vertical.

$c$ is the casing or hood forming an ornamental border covering the sides, top and bottom of the radiator core.

This hood has extensions $c^2\ c^2$ at each side which have outer edges $c^4$ starting at the top of the radiator and inclining forward to the bottom thereof leaving an open space between them. These extensions are formed by bending and shaping the metal as shown most distinctly in Fig. 5, the outer edges being rounded and inclined outward from the top to the bottom of the radiator.

$c^3$ is a horizontal portion of the hood extending between the lower edges of the extensions $c^2\ c^2$. The extensions $c^4$ and the part $c^3$ joining the lower edges of the same are formed integral and of sheet metal bent upon itself so as to have the plane surfaces approximately parallel and at a distance from each other as shown in the drawing, Figs. 4 and 5. In Fig. 4 the shape of the part $c^3$ in cross section is shown at $c^5$.

This makes a firm, rigid, strong and ornamental construction protecting the radiator and producing a consistent and ornamental outline of the automobile in side elevation, as shown in Fig. 2, and tends because of its rounded edges and concave shape to increase the draft of air through the radiator during the operation of the automobile.

The projecting sides serve as a protection to the radiator core.

What I claim is:

1. In an automobile having a radiator core arranged approximately vertical thereon, a hood or cover for said radiator having forwardly extending portions at its outer edges leaving an unobstructed space therebetween, said portions having their outer edges inclining forward from the top downward.

2. In an automobile having a radiator core arranged approximately vertical thereon, a hood or cover for said radiator having forwardly extending portions at its outer edges leaving an unobstructed space therebetween, said portions having their outer edges inclining forward from the top downward, and a horizontal portion joining the lower edge of said portions.

3. The combination of a radiator, a hood therefor, said hood having forwardly extending portions at the side of the radiator leaving an unobstructed space therebetween, said portions consisting of sheet metal bent upon itself, said portions having their outer edges inclined forward from the top downward.

4. The combination of a radiator, a hood therefor, said hood having forwardly extending portions at the side of the radiator leaving an unobstructed space therebetween, said portions consisting of sheet metal bent upon itself, said portions having their outer edges inclined forward from the top downward, and a horizontal portion extending between the lower edges of said forwardly extended portions bent upon itself substantially as shown and described.

In testimony whereof, I sign this specification.

RODOLPHE STAHL.